(12) United States Patent
Ferguson et al.

(10) Patent No.: US 9,416,913 B2
(45) Date of Patent: Aug. 16, 2016

(54) QUICK MOUNT CONNECTOR

(71) Applicant: Lyngsoe Systems Limited, Mississauga (CA)

(72) Inventors: Don Ferguson, Mississauga (CA); Mircea Paun, Mississauga (CA); Steve Taylor, Mississauga (CA)

(73) Assignee: Lyngsoe Systems Limited, Mississauga (CA)

( * ) Notice: Subject to any disclaimer, the term of this patent is extended or adjusted under 35 U.S.C. 154(b) by 0 days.

(21) Appl. No.: 14/449,740

(22) Filed: Aug. 1, 2014

(65) Prior Publication Data
US 2015/0034789 A1    Feb. 5, 2015

Related U.S. Application Data

(60) Provisional application No. 61/861,280, filed on Aug. 1, 2013.

(51) Int. Cl.
| *F16M 11/10* | (2006.01) |
| *F16M 11/12* | (2006.01) |
| *F16M 11/20* | (2006.01) |
| *F16M 13/02* | (2006.01) |

(52) U.S. Cl.
CPC ............ *F16M 11/105* (2013.01); *F16M 11/10* (2013.01); *F16M 11/12* (2013.01); *F16M 11/2014* (2013.01); *F16M 11/2021* (2013.01); *F16M 13/02* (2013.01); *F16M 2200/024* (2013.01)

(58) Field of Classification Search
CPC ... F16M 11/08; F16M 11/2014; F16M 11/10; F16M 11/2021; F16M 2200/024; F16M 11/22; F16M 2200/08; Y10T 403/32336; Y10T 403/32361

USPC ............ 248/371, 177.1, 178.1, 176.3, 183.1, 248/183.2, 122.1, 519; 403/92–94, 96, 403/359.5, 359.1, 378, 359.6
See application file for complete search history.

(56) References Cited

U.S. PATENT DOCUMENTS

| 2,587,838 | A | * | 3/1952 | Green | ......................... 403/359.1 |
| 4,034,946 | A | * | 7/1977 | Zimmer, Jr. | ................ 248/183.2 |

(Continued)

FOREIGN PATENT DOCUMENTS

JP    63300698    12/1988

OTHER PUBLICATIONS

Written Opinion and International Search Report of PCT/CA2014/000597 dated Nov. 3, 2014.

*Primary Examiner* — Ingrid M Weinhold
(74) *Attorney, Agent, or Firm* — Brinks Gilson & Lione

(57) ABSTRACT

A quick mount connector allows for easy rotation of an object, such as an antenna. The connector has a base, a coupling member and an object mount. The base is configured for connection to a surface and includes base teeth around an inner circumference. The coupling member is configured to be inserted into the base and rotates relative the base about a first axis of rotation. The coupling member has a cylindrical portion with mating teeth along its outer circumference; the mating teeth are configured to engage the base teeth. The object mount attaches to the coupling member and rotates relative the coupling member about a second axis of rotation. The object mount has a mounting plate configured for connection to the object; and a locking assembly configured to adjustably couple the coupling member to the object mount.

12 Claims, 14 Drawing Sheets

(56) References Cited

U.S. PATENT DOCUMENTS

| | | |
|---|---|---|
| 4,725,027 A | 2/1988 | Bekanich |
| 5,109,411 A * | 4/1992 | O'Connell .................... 379/454 |
| 5,207,791 A * | 5/1993 | Scherbarth ................ 273/148 B |
| 5,641,147 A * | 6/1997 | Pena ............................. 473/552 |
| 5,816,113 A | 10/1998 | Fohl |
| 6,244,553 B1 | 6/2001 | Wang |
| 6,357,712 B1 * | 3/2002 | Lu .............................. 248/291.1 |
| 6,390,424 B1 | 5/2002 | Kidushim et al. |
| 6,513,774 B2 * | 2/2003 | Hailson ................... 248/288.51 |
| 6,522,748 B1 | 2/2003 | Wang |
| 7,367,740 B2 * | 5/2008 | Lazic et al. ..................... 403/97 |
| 7,431,250 B2 * | 10/2008 | Chen .......................... 248/205.5 |
| 7,461,826 B2 * | 12/2008 | Carnevali ................. 248/292.12 |
| 8,020,823 B2 * | 9/2011 | Wang ......................... 248/278.1 |
| 8,091,843 B2 * | 1/2012 | Tsai ........................... 248/206.2 |
| 8,313,067 B2 | 11/2012 | Knieriem et al. |
| 2001/0046409 A1 | 11/2001 | Fischer |
| 2004/0099775 A1 * | 5/2004 | Zheng et al. ............... 248/206.3 |
| 2005/0006542 A1 * | 1/2005 | Henning et al. ........... 248/274.1 |
| 2013/0134196 A1 * | 5/2013 | Lee ............................... 224/448 |

* cited by examiner

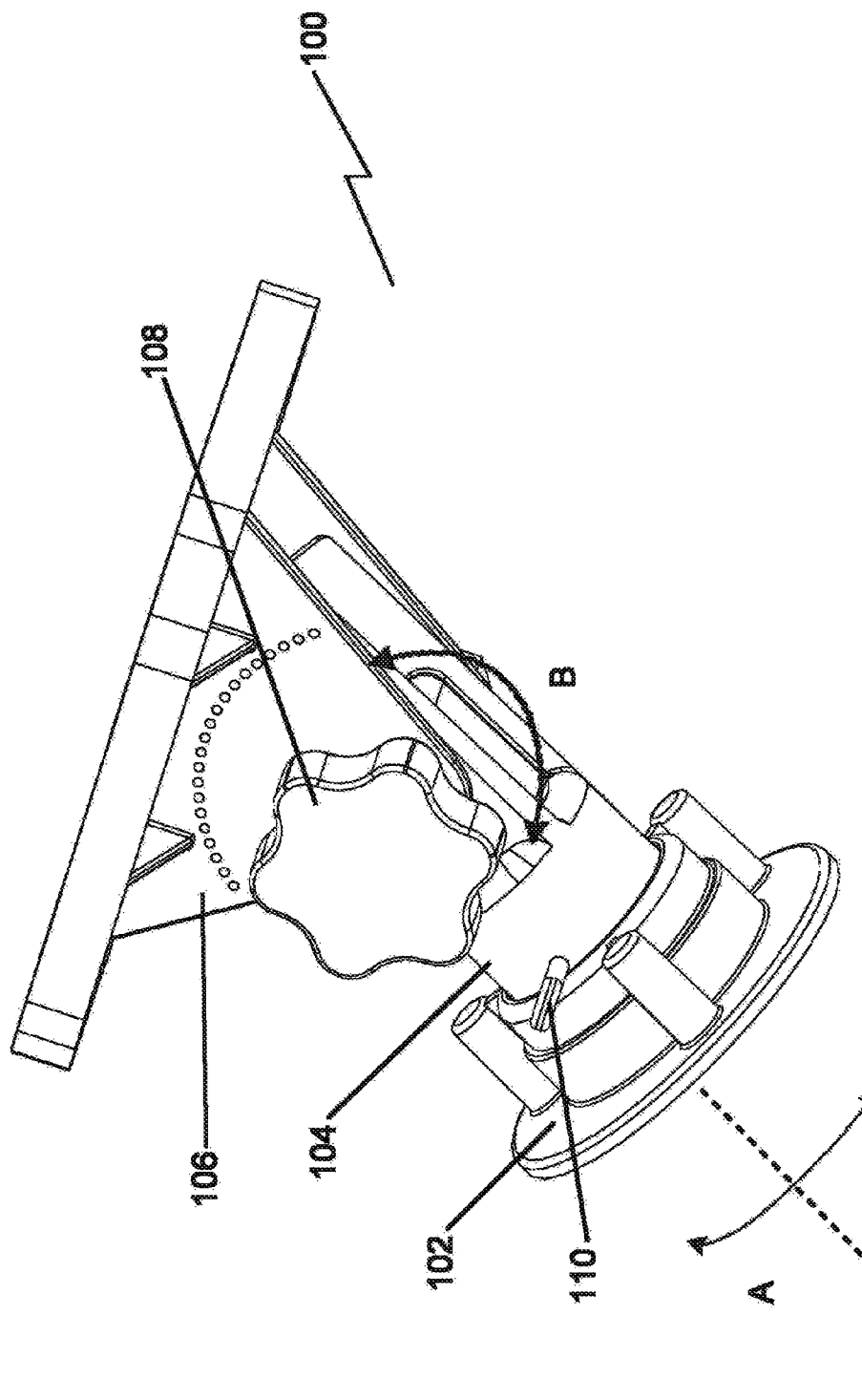

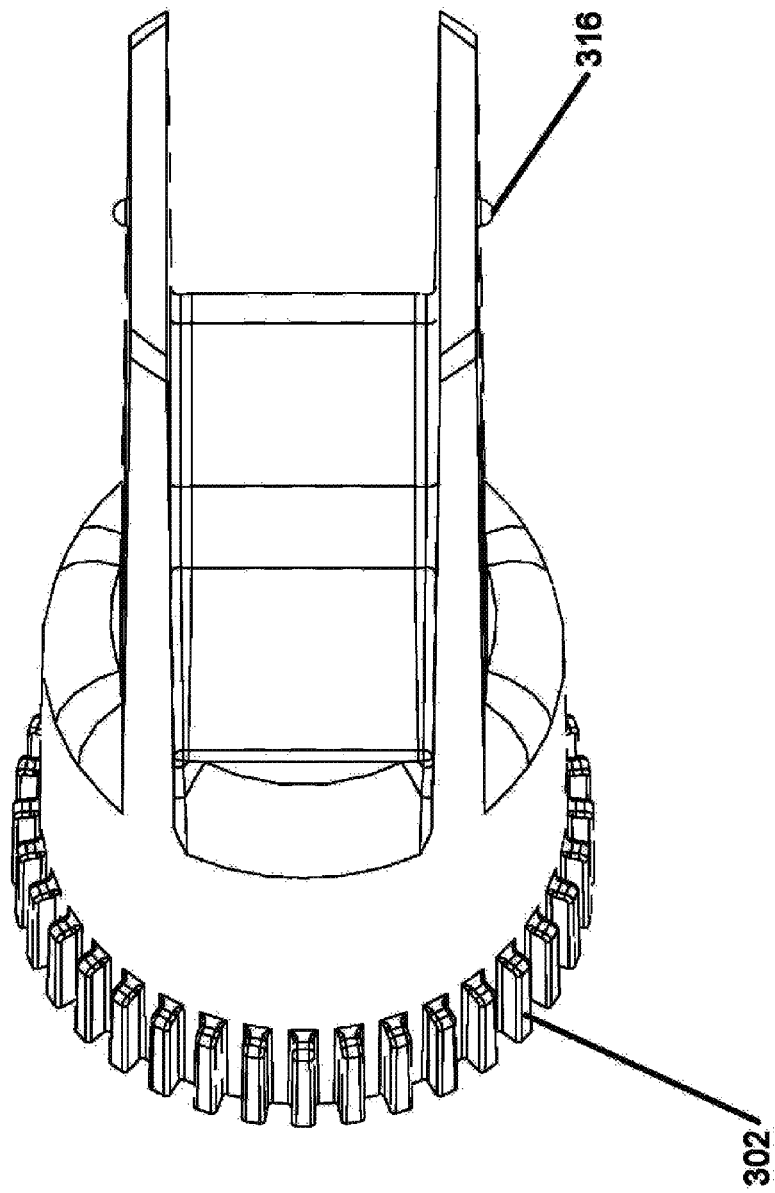

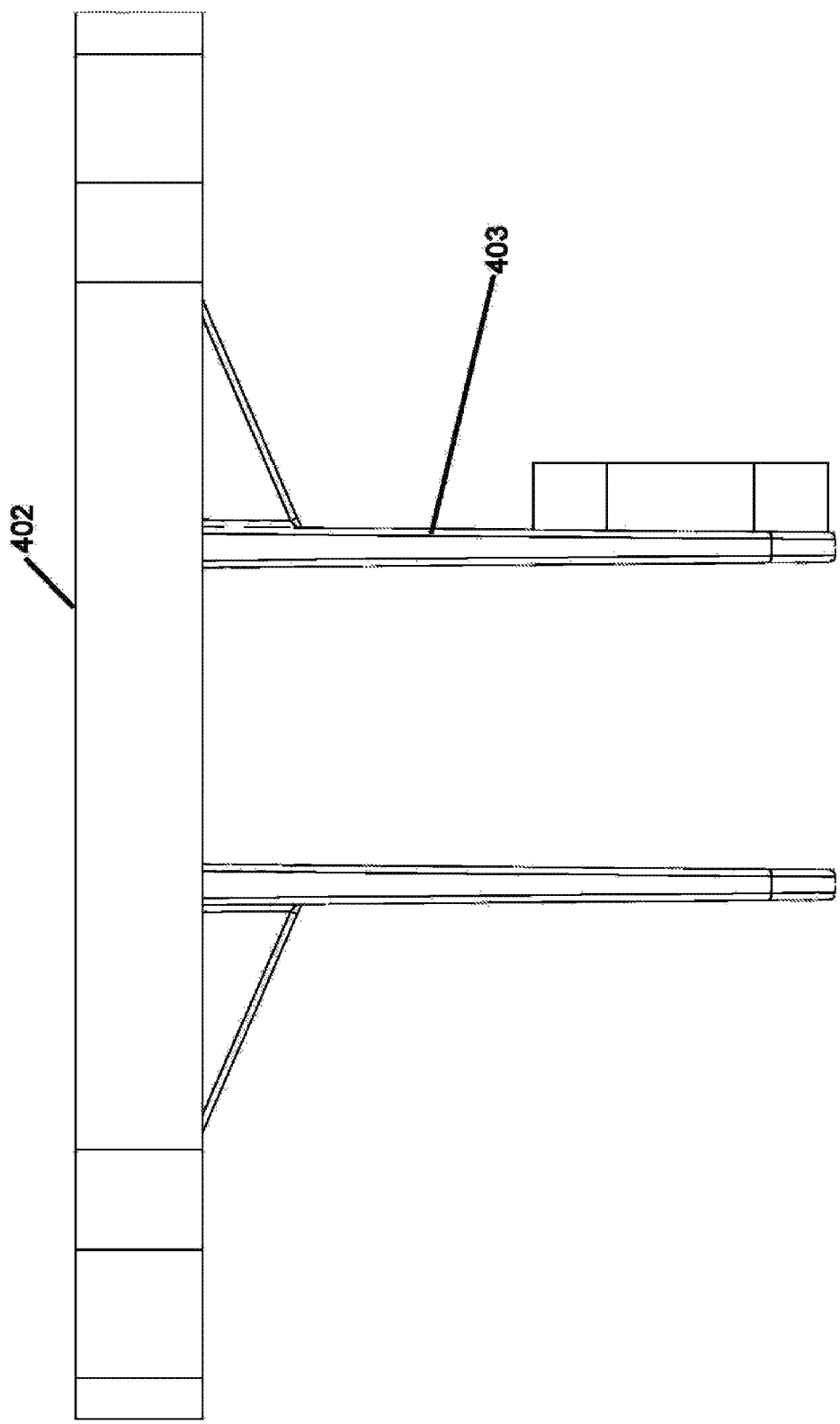

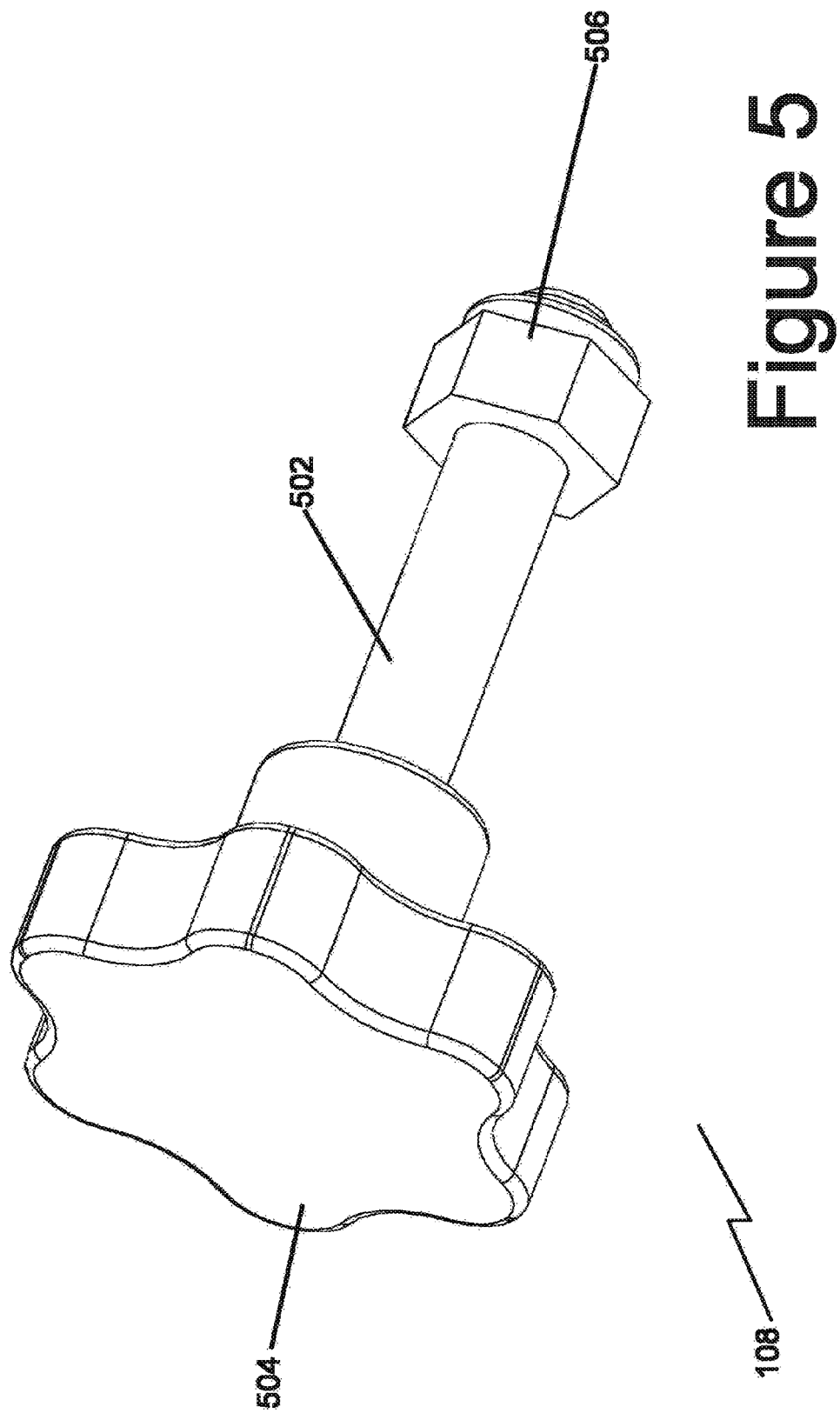

QUICK MOUNT CONNECTOR

This application claims the benefit of provisional application Ser. No. 61/861,280, filed on Aug. 1, 2013, the contents of which are incorporated herein by reference in their entirety.

The present invention relates generally to connectors and in particular, to an improved quick mount connector that provides multiple axes of rotation.

BACKGROUND OF THE INVENTION

Often times it is necessary to mount an object to surface, while facilitating a position of the object to be modified as necessary. Accordingly, a number of connectors have been developed so that the object can be mounted to the surface and then the angle and direction in which the object is position can be dynamically modified. As an example, in a Radio Frequency Identification (RFID) system, antennas are mounted to a portal. The direction in which each antenna is mounted affects the transmission and reception of RFID signals. Accordingly, connectors are used to allow the direction of the antenna to be changed without reattaching the connector each time.

However, existing connectors are expensive to manufacture and often include several moving parts. Accordingly, there exists a need for improvements to quick mount connectors.

SUMMARY OF THE INVENTION

In accordance with an aspect of an embodiment there is provided a connector comprising: a base configured for connection to a surface, the base comprising: a first cylindrical portion; a second cylindrical including base teeth along its inner circumference; and a lip covering the base teeth; a coupling member configured to be inserted into the base and rotate relative the base about a first axis of rotation, the coupling member comprising: a cylindrical portion including mating teeth along its out circumference, the mating teeth configured to engage the base teeth and the lip; and a pair of substantially parallel plates extending from the cylindrical portion; an object mount configured to be attached to the coupling member and rotate relative the coupling member about a second axis of rotation, the coupling member comprising an object mounting plate configured for connection to an object; and a locking assembly configured to adjustably couple the coupling member to the object mount.

BRIEF DESCRIPTION OF THE DRAWINGS

Embodiments of the invention will now be described by way of example only with reference to the accompanying drawings in which:

FIG. 1a is an isometric view of a connector;

FIG. 1b is a sectional isometric view of the connector of FIG. 1a;

FIG. 2a is an isometric view of a base of the connector of FIG. 1a;

FIG. 2b is a front side elevation view of the base of FIG. 2a;

FIG. 2c is a plan view of the base of FIG. 2a;

FIG. 3a is an isometric view of a coupling member of the connector of FIG. 1a;

FIG. 3b is a front side elevation view of the coupling member of FIG. 3a;

FIG. 3c is a plan view of the coupling member of FIG. 3a;

FIG. 4a is an isometric view of an object mount of the connector of FIG. 1a;

FIG. 4b is a front side elevation view of the object mount of FIG. 4a;

FIG. 4c is a right side elevation view of the object mount of FIG. 4a;

FIG. 4d is a plan view of the object mount of FIG. 4a;

FIG. 5 is an isometric view of a locking assembly of FIG. 1a; and

FIG. 6 is an isometric view of a pin of FIG. 1a.

DETAILED DESCRIPTION OF THE EMBODIMENTS

Figure 1B:
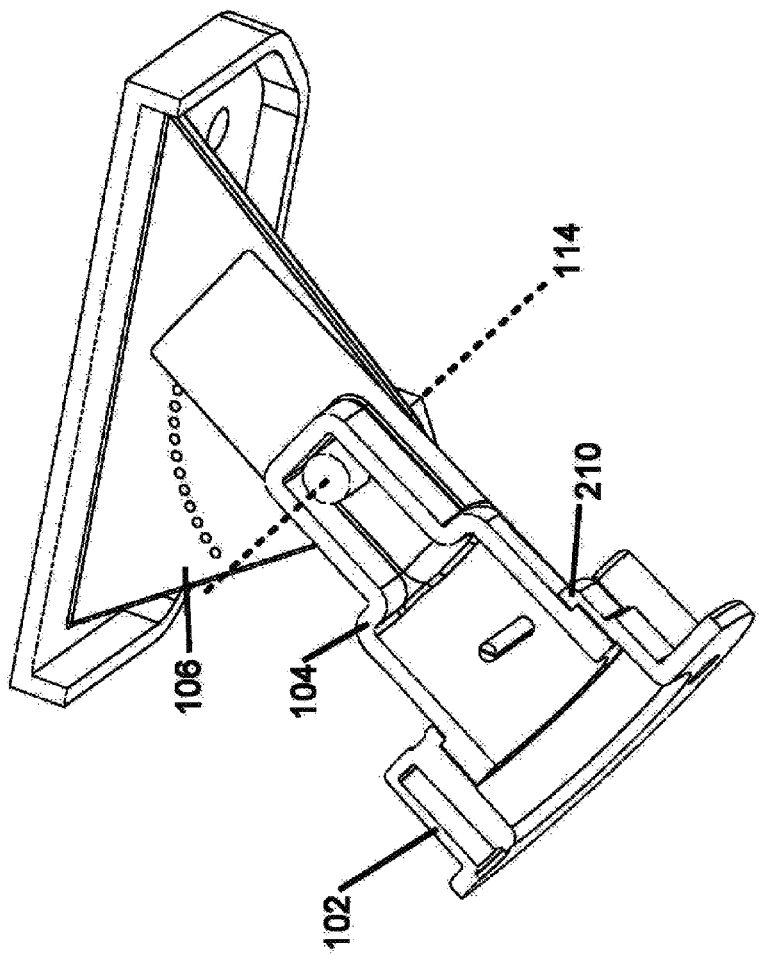

For convenience, like numerals in the description refer to like structures in the drawings. Referring to FIGS. 1a and 1b, an isometric view of a connector is illustrated generally as reference numeral 100. The connector 100 comprises a base member 102, a coupling member 104, an object mount 106, a locking assembly 108 and a pin 110.

The base member 102 is configured to be attached to a structure or surface upon which the entire connector 100 is to be mounted. The object mount 106 is configured to be attached to an object, such as an antenna for example. The coupling member 104 is configured to be rotatably coupled to the base member 102. Specifically, the coupling member 104 is configured to rotate about a first axis of rotation 112, aligned with its central axis. Accordingly, the coupling member 104 can rotate in the direction indicated by arrow A. The object mount 106 is configured to be rotatably coupled to coupling member 106. Specifically, the object mount 106 is configured rotate about a second axis of rotation 114. The second axis of rotation 114 is located at a point of connection between the coupling member 104 and the object mount 106 and is normal to the first axis of rotation 112. Accordingly, the object mount 106 can rotate in the direction indicated by arrow B.

Figure 2A:
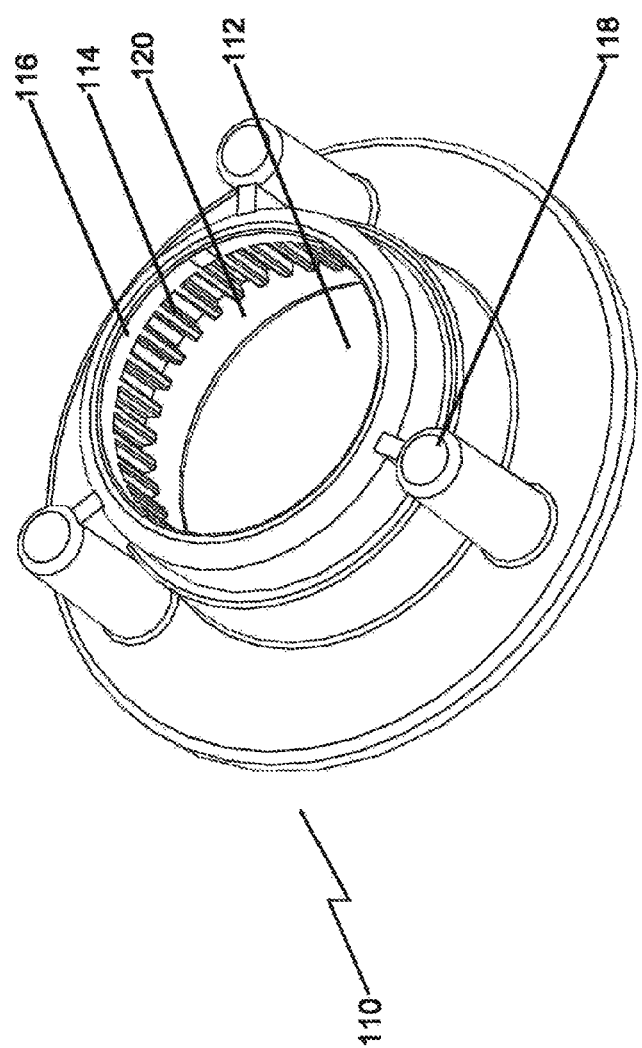
Figure 2B:
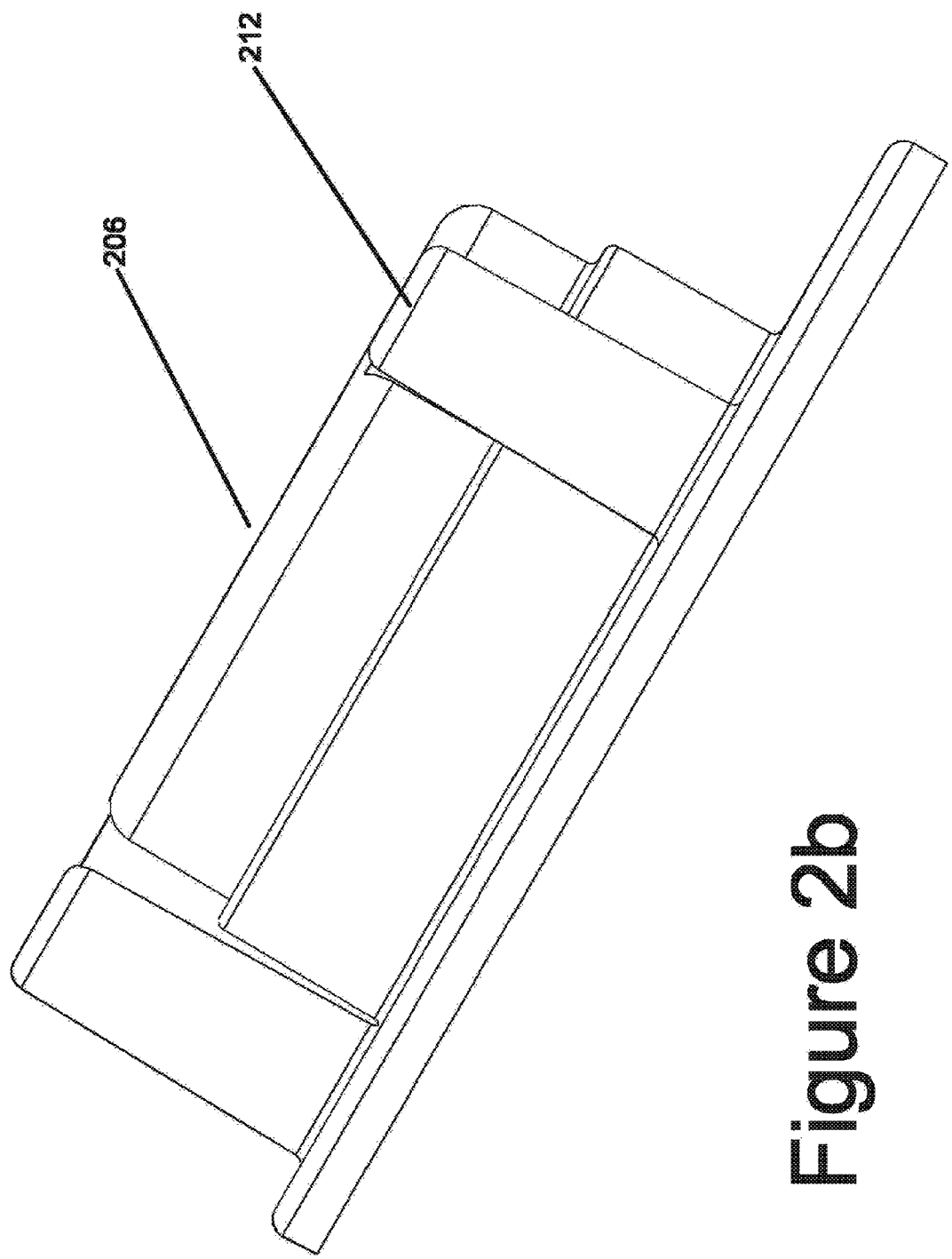
Figure 2C:
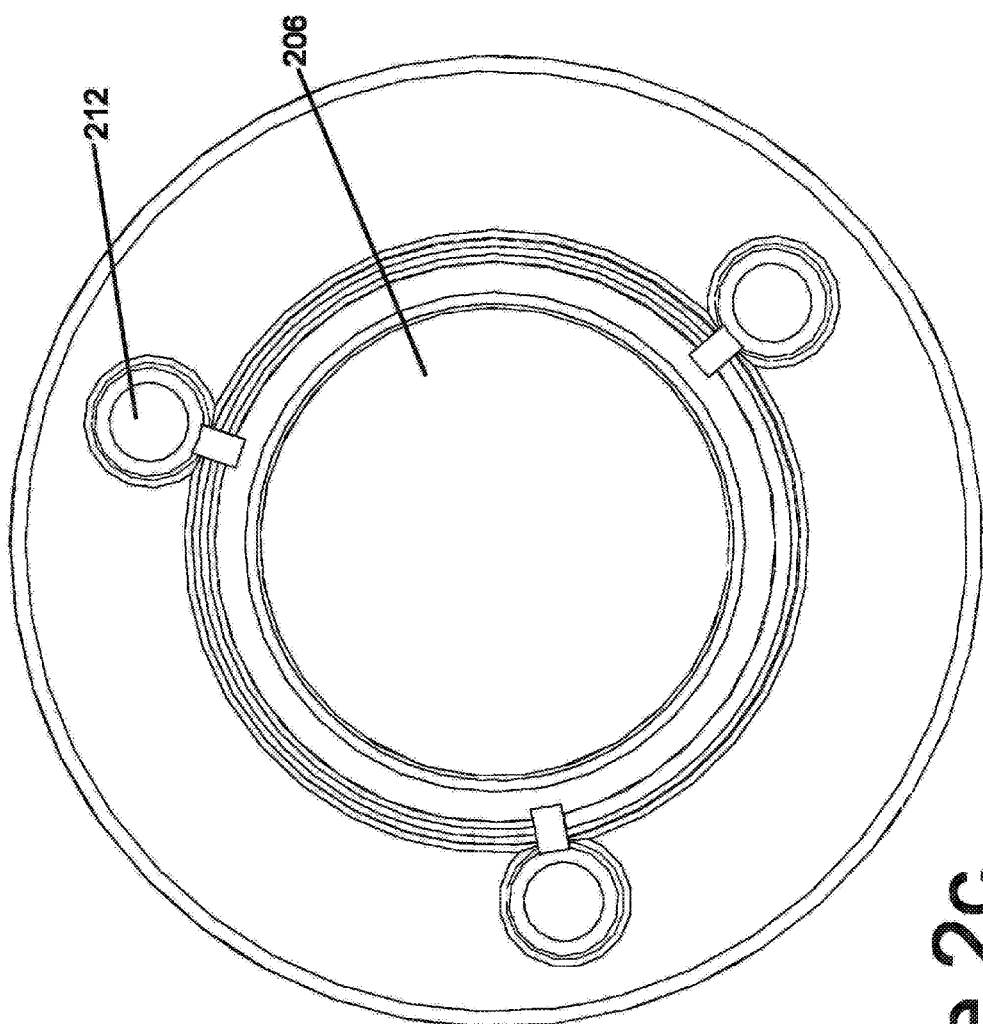

Referring now to FIGS. 2a to 2c, the base member 102 is illustrated in greater detail. The base member 102 comprises support plate 201, a cylinder 203 and attachment passages 212. In this embodiment, the support plate 201 is ring shaped and includes a plurality of openings (not shown). The cylinder 203 includes a first cylindrical portion 202, a second cylindrical portion 204, an opening 206, base teeth 208, and a lip 210. The first cylindrical portion 202 is proximate to the inner circumference of the support plate 201. The second cylindrical portion 204 is distal to the inner circumference of the support plate 201. In this embodiment, the first cylindrical portion 202 has a greater circumference than the second cylindrical portion 204. The base teeth 208 project from the inner surface of the second cylindrical portion 204. The lip 210 is configured to cover the base teeth 208. Thus, the opening 206 of the cylinder 203 is smaller at the second cylindrical portion 204 than at the first cylindrical portion 202. The attachment passages 212 are positioned by the openings in the support plate 201 and are sized to receive screw, bolts or the like to connect the base member 102 to a mounting surface.

Figure 3A:
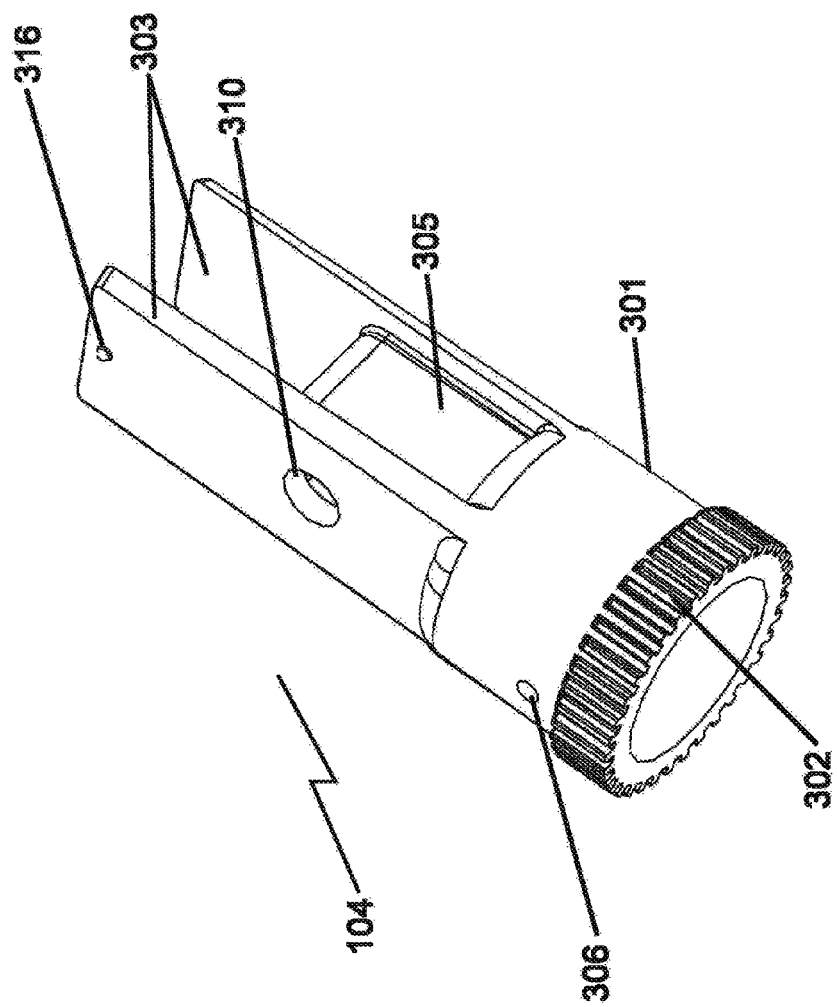
Figure 3B:
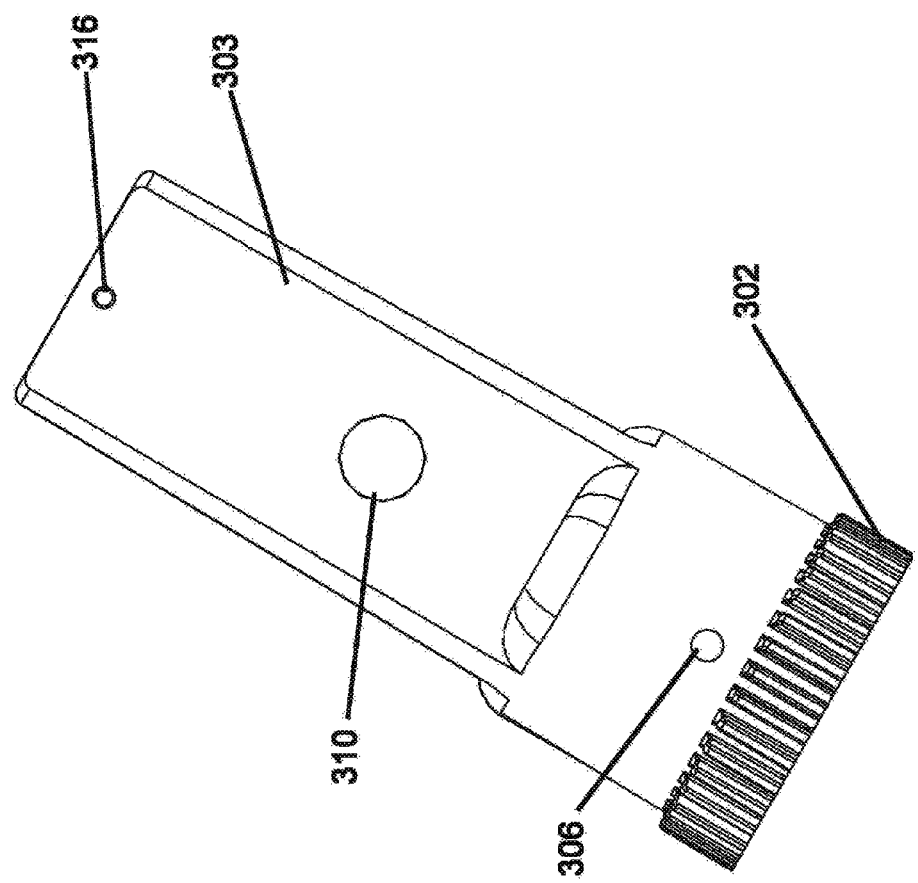
Figure 4A:
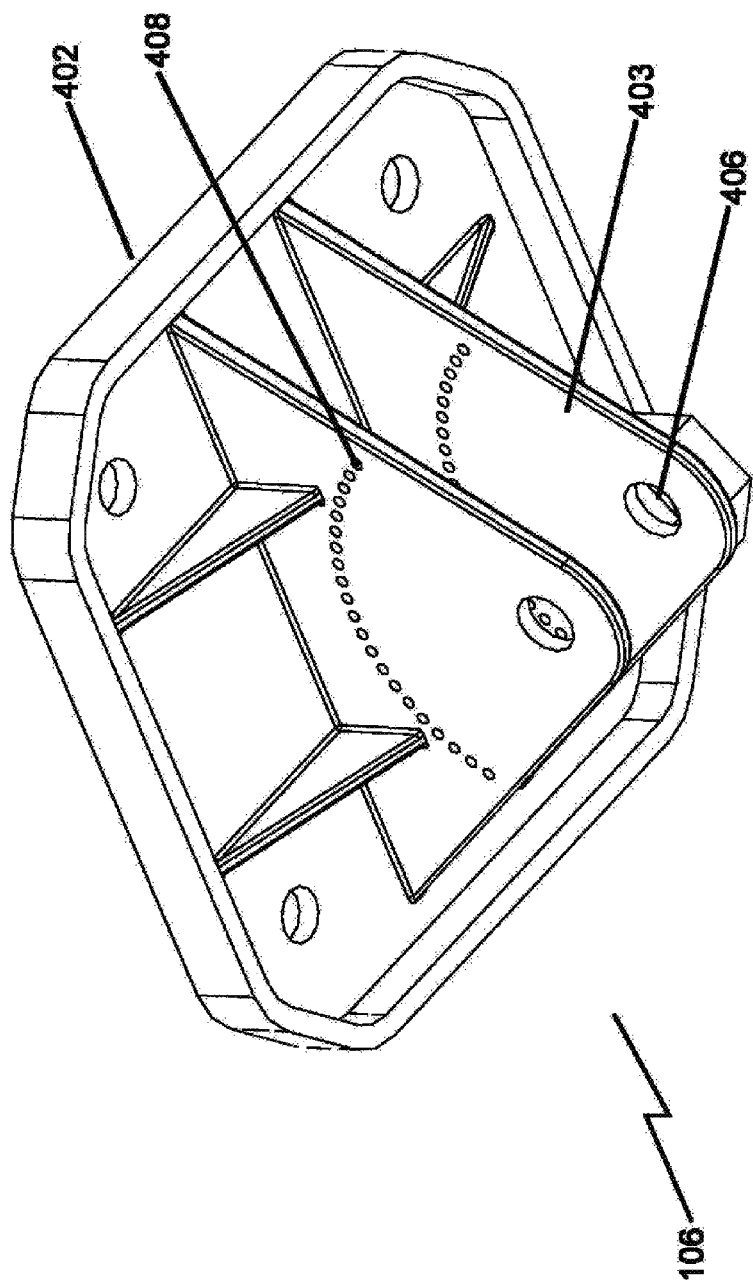
Figure 4B:
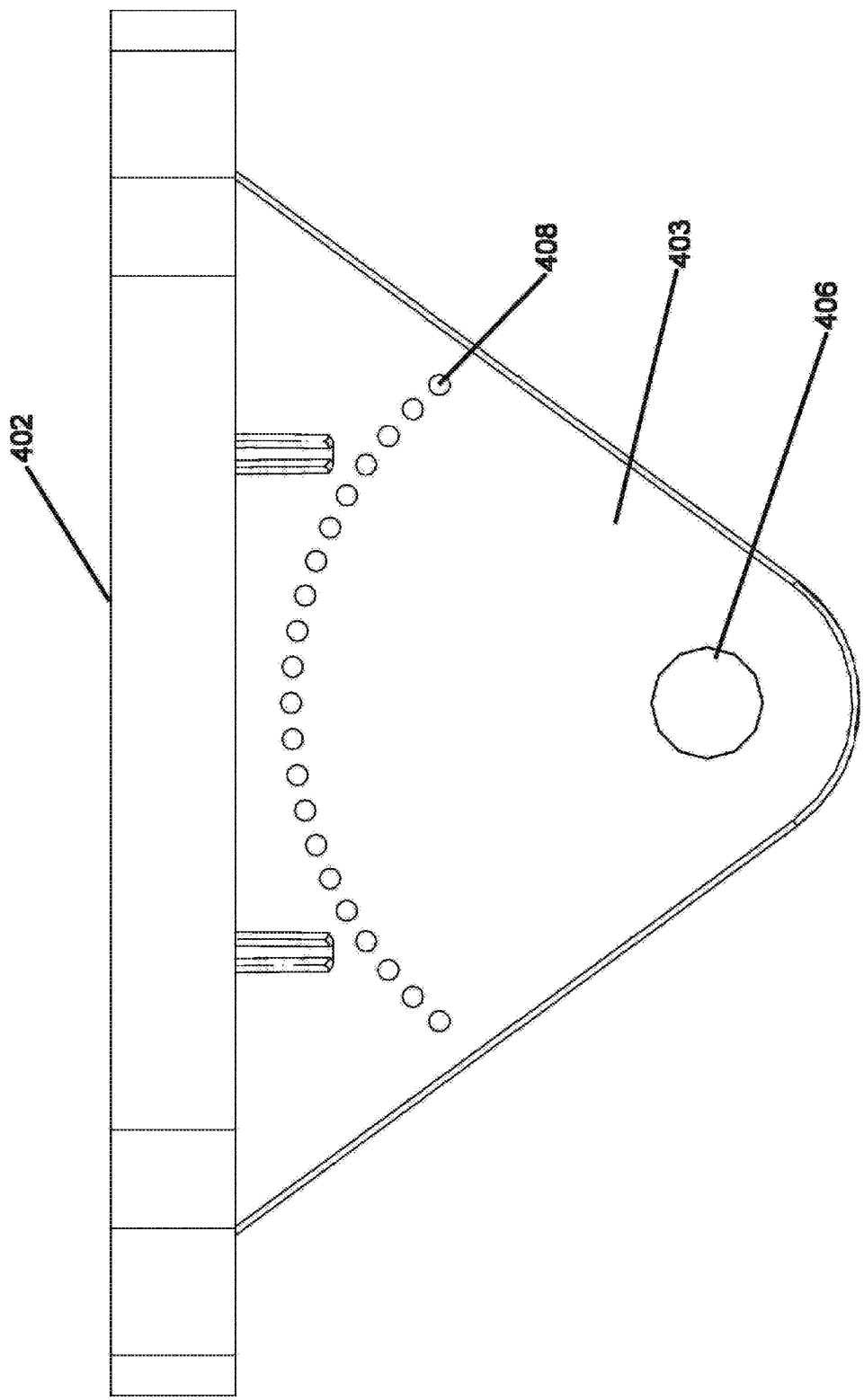
Figure 4D:
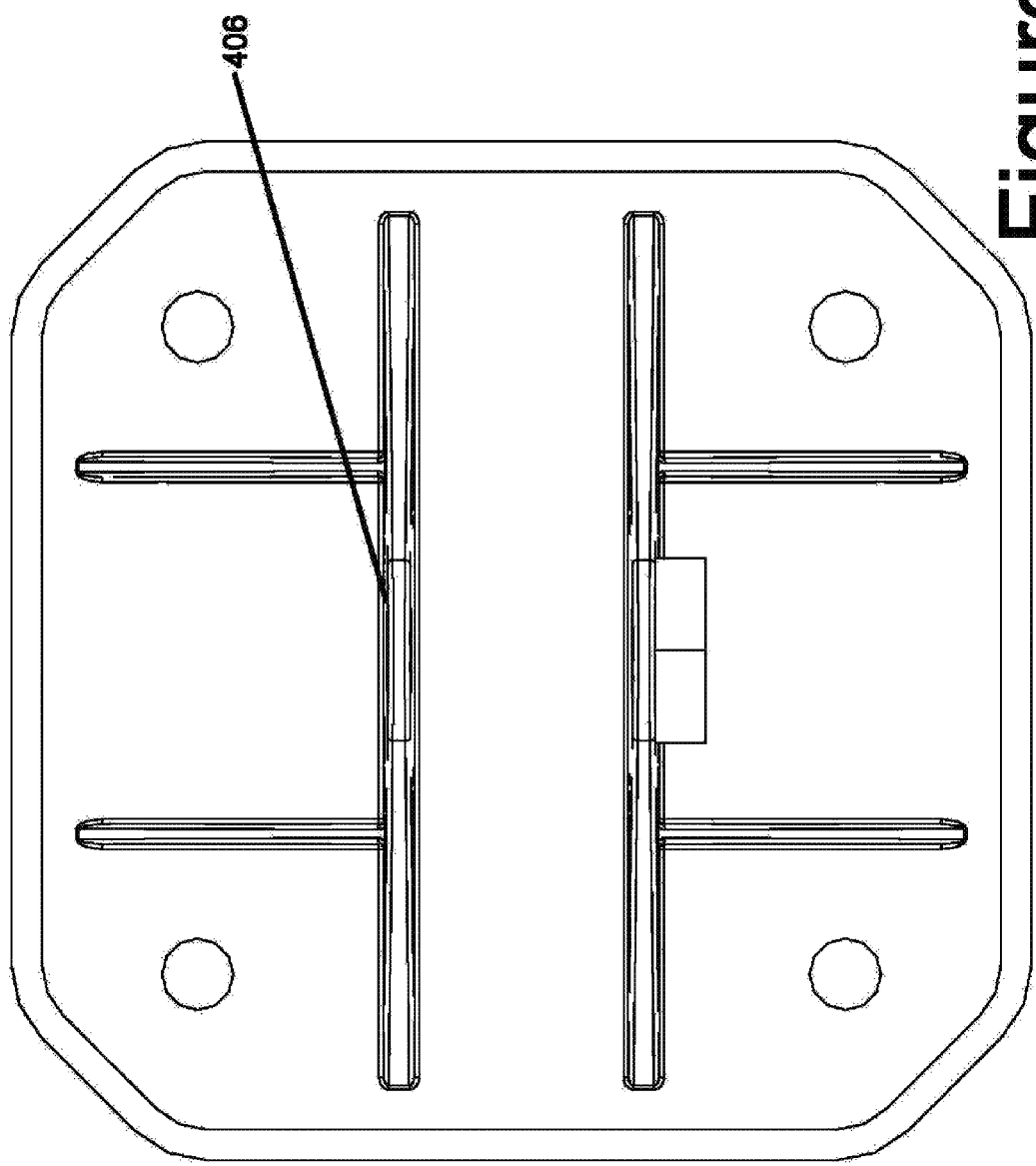

Referring now to FIGS. 3a to 3c, the coupling member 104 is illustrated in more detail. The coupling member 104 comprises a cylindrical portion 301, a pair of spaced apart plates 303 and a support block 305.

The cylindrical portion 301 includes coupling teeth 302 and pin holes 306. The coupling teeth 302 are positioned along an edge of the cylindrical portion 301 and project from the outer surface. The pin holes 306 are diametrically opposed and positioned away from the coupling teeth 302.

Specifically, the pin holes 306 are positioned at a distance sufficient to accommodate the lip 210 of the base member 102.

The plates 303 are generally rectangular and extend from the cylindrical portion 301 away from the coupling teeth 302. The plates 303 include bolt apertures 310 and protrusions 316. The support block 305 is positioned between the pair of plates and configured to extend along only a portion of the length of the plates 303. Bolt apertures 310 are positioned at opposing bolt positions in the plates 303. In this embodiment, the support block 305 is present at the bolt positions in the plates 303. Accordingly, the bolt apertures 310 extend through the support block 305. Each plate 303 includes at least one of the protrusions 316 near a plate end distal to the coupling teeth 302.

Referring now to FIGS. 4a to 4d, the object mount 106 is illustrated in more detail. The object mount 106 comprises an object mounting plate 402 and a pair of coupling plates 403. Each of the coupling plates 403 includes a mount bolt aperture 406 and recesses 408. The coupling plates 403 are normal to the object mounting plate 402 and positioned on an opposite surface of the object mounting plate 402 to which the object is to be attached. The coupling plates 403 are substantially triangular and attached to the object mounting plate 402 at their base. Further, the coupling plates 403 stand proud of the object mounting plate 402 and are substantially parallel to each other in a spaced apart relationship. The recesses 408 are sized to receive the protrusions 316 of the coupling member 104. Further, the recesses 408 are aligned in an arcuate manner such that they are furthest from the object mounting plate 402 at the edges of the coupling plates 403.

Referring to FIG. 5, the locking assembly 108 is shown in greater detail. In this embodiment, the locking assembly 108 includes a bolt 502 affixed, at one end, to a knob 504. The bolt 502 is configured to be inserted through the bolt apertures 310 and the mount bolt apertures 406, and fastened in place using a nut 506. The locking assembly 108 can be loosened and tightened by rotation of the knob 504.

Figure 6:
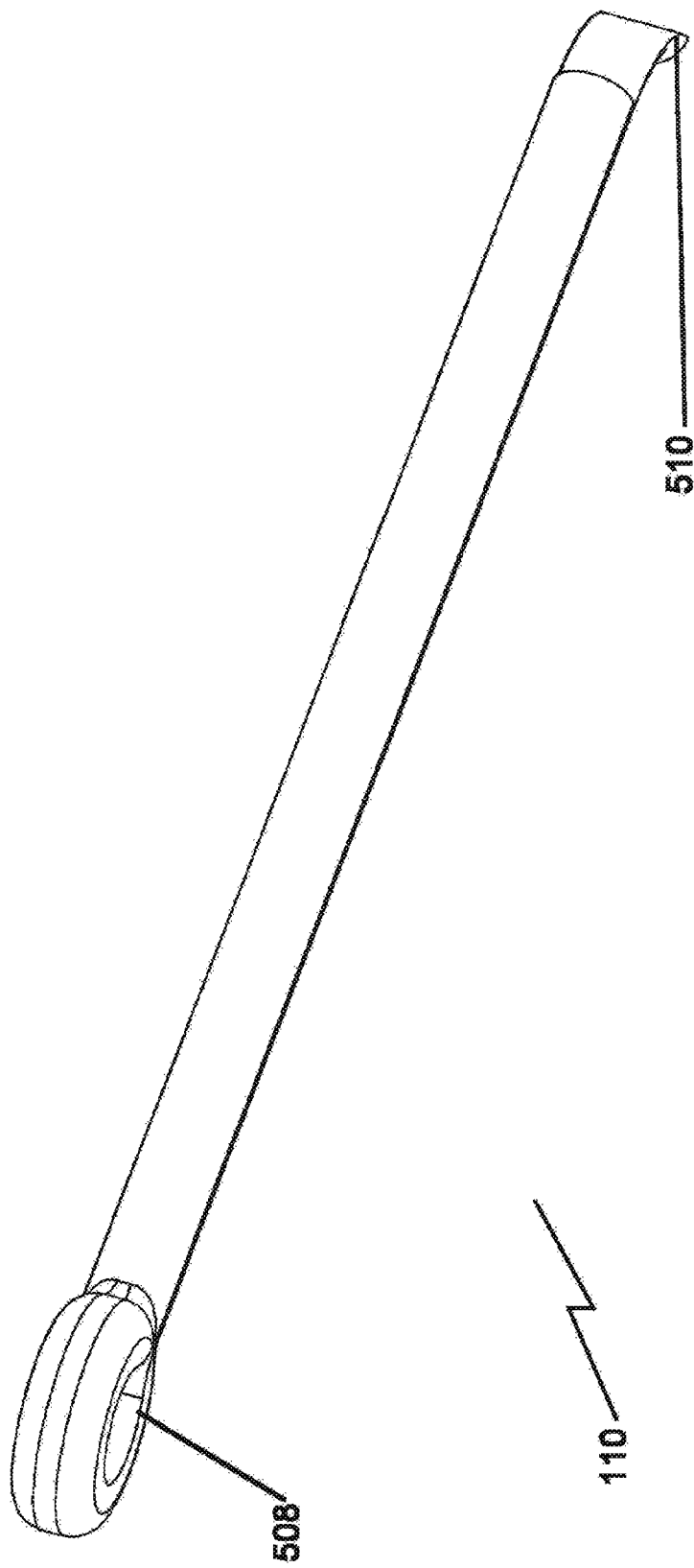

Referring to FIG. 6, the pin 110 is shown in greater detail. In this embodiment, the pin 110 comprises a round end 508 end an angled end 510. The rounded end 508 assists in gripping the pin 110 for removal or insertion in the pin holes 306. The angled end 510 is configured to inhibit accident removal from the pin holes 306.

To assemble the connector 100, the coupling member 104 is coupled with the base member 102 by inserting the coupling member 104 through the opening 206 of the cylinder 203 until the coupling teeth 302 engage the base teeth 208. Complete passage of the coupling member 104 through the opening 206 is blocked when the coupling teeth 302 engage the lip 210. The coupling member 104 can be locked in place by inserting the pin 110 through the pin holes 306. This restricts the coupling member 104 from being withdrawn through the opening 106 and holds the lip 210 between the pin 110 and the coupling teeth 302.

The object mount 106 is coupled with the coupling member 104 by aligning the mount bolt apertures 406 on the object mount 106 with the bolt apertures 310 on the coupling member 104 and inserting the locking assembly 108 there through. The protrusion 316 is positioned to engage a corresponding one of the recesses 408 on the object mount 106. As the locking assembly 108 is tightened, a greater pressure is applied between the plates 303 of the coupling member 104 and the coupling plates 403 of the object mount 106. Accordingly, the protrusions 316 more robustly engage the corresponding recesses 408 and restrict rotation of the object mount 106 about the second axis of rotation 114. Base member 102 can be attached to a surface and an object can be attached to the object mount 106.

The positioning of the object can be adjusted by rotating the coupling member 104 about the first axis of rotation 112 and rotating the object mount 106 about the second axis of rotation 114. In order to rotate the coupling member 104, the pin 110 is removed from the pin holes 306. The coupling member 104 can be moved so that the coupling teeth 302 are positioned within the first cylindrical section 202 of the base member 102 and, thereby, disengaged from the base teeth 208. This allows the coupling member 104 to be rotated about the first axis of rotation 112. Once the desired position is reached, the coupling member 104 can be moved so that the coupling teeth 302 are positioned within the second cylindrical section 204 of the base member 102 and, thereby, re-engaged with the base teeth 208. The coupling member 104 is locked in position by replacing the pin 110 into the pin holes 306. As will be appreciated by a skilled person, the resolution at which coupling member 104 can be rotated depends, at least in part on the size of the base teeth 208 and the coupling teeth 302.

In order to rotate the object mount 106, the locking assembly 108 is loosened by rotating the knob 504. The pressure applied between the plates 303 of coupling member 104 and the coupling plates 403 of the object mount 106 is lessened. This allows the object mount 106 to be rotated about the second axis of rotation 114. Once the desired position is reached, the locking assembly 108 is tightened and the protrusions 316 once again engages corresponding recesses 408, thereby restricting rotation of the object mount 106 about the second axis of rotation 114. As will be appreciated by a skilled person, the resolution at which object mount 106 can be rotated depends, at least in part on the size of the protrusion 316 and the recesses 408, as well as the number of recesses 408.

The configuration of the connector 100 permits for adjustment of orientation of the object mount 106 such that an object, such as an antenna, connected to the object mounting plate 402 can quickly and easily be positioned in a variety of directions at a number of different angles. The parts of the connector 100 are relatively inexpensive and easily manufactured.

Although the embodiment described above uses the pin 110 to lock the coupling member 104 is place, the pin 110 may be optional. For example, if the base member 102 is connected to a surface so that it is positioned above the object mount 106, gravity may be sufficient to maintain engagement between the base teeth 208 and the coupling teeth 302.

A person of skill in the art will appreciate that while bolts are described as connecting the base member 102 to a mounting surface, any suitable connection means may be used. Furthermore, greater or fewer attachment passages 212 may be used. In addition, the attachment passages 212 may be excluded and an adhesive may be used to connect the base member 102 to a mounting surface.

Although embodiments have been described above with reference to the figures, those of skill in the art will appreciate that variations and modifications may be made without departing from the scope thereof as defined by the appended claims.

What is claimed is:
1. A connector comprising:
a base configured for connection to a surface, the base comprising:
an annular support plate configured to be connected to the surface;
a first cylindrical portion coupled to the support plate;

a second cylindrical portion coupled to the first cylindrical portion and having a smaller circumference than the first cylindrical portion, the second cylindrical portion including a plurality of spaced apart base teeth along an inner circumference thereof; and a lip circumscribing an end of the second cylindrical portion distal the first cylindrical portion;

wherein the base teeth extend from and are normal to the lip;

a coupling member comprising:

a coupling cylindrical portion including mating teeth along an outer circumference thereof; and a pair of substantially parallel plates extending from the coupling cylindrical portion;

wherein the coupling member is configured to be inserted into the base such that when the mating teeth of the coupling cylindrical portion are located within the first cylindrical portion, the coupling member is rotatable relative to the base about a first axis of rotation, and when the coupling member is fully inserted into the base, the mating teeth engage the base teeth and the lip;

an object mount configured to be attached to the coupling member and rotate relative to the coupling member about a second axis of rotation, the object mount comprising an object mounting plate configured for connection to an object; and a locking assembly configured to adjustably couple the coupling member to the object mount.

2. The connector of claim 1, wherein each of the parallel plates includes a protrusion.

3. The connector of claim 2, wherein the object mount further comprises a pair of coupling plates extending normal to the object mounting plate, each of the coupling plates including a plurality of recesses configured to receive a corresponding one of the protrusions.

4. The connector of claim 1 further comprising a pin configured to inhibit the coupling member from being withdrawn from the base.

5. The connector of claim 4, wherein the coupling member comprises a pair of pin holes configured to receive the pin.

6. The connector of claim 5, wherein the pin holes are diametrically opposed.

7. The connector of claim 5, wherein the pin holes are configured proximate the mating teeth to provide space for the lip of the base to be positioned between the mating teeth and the pin holes.

8. The connector of claim 4, wherein the pin includes a round end and an angled end to inhibit accidental removal of the pin from the pin hole.

9. The connector of claim 1, wherein the locking assembly comprises a nut and bolt.

10. The connector of claim 1, wherein adjustment of the locking assembly to a tightened position restricts movement of the object mount about the second axis of rotation and adjustment of the locking assembly to a loosened position permits movement of the object mount about the second axis of rotation.

11. The connector of claim 1, wherein the locking assembly defines the second axis of rotation.

12. The connector of claim 1, wherein the first axis of rotation is normal to the second axis of rotation.

* * * * *